Nov. 3, 1936. J. E. LARASON Re. 20,159
PROPELLER CLAMPING AND BALANCING RING
Original Filed March 20, 1934
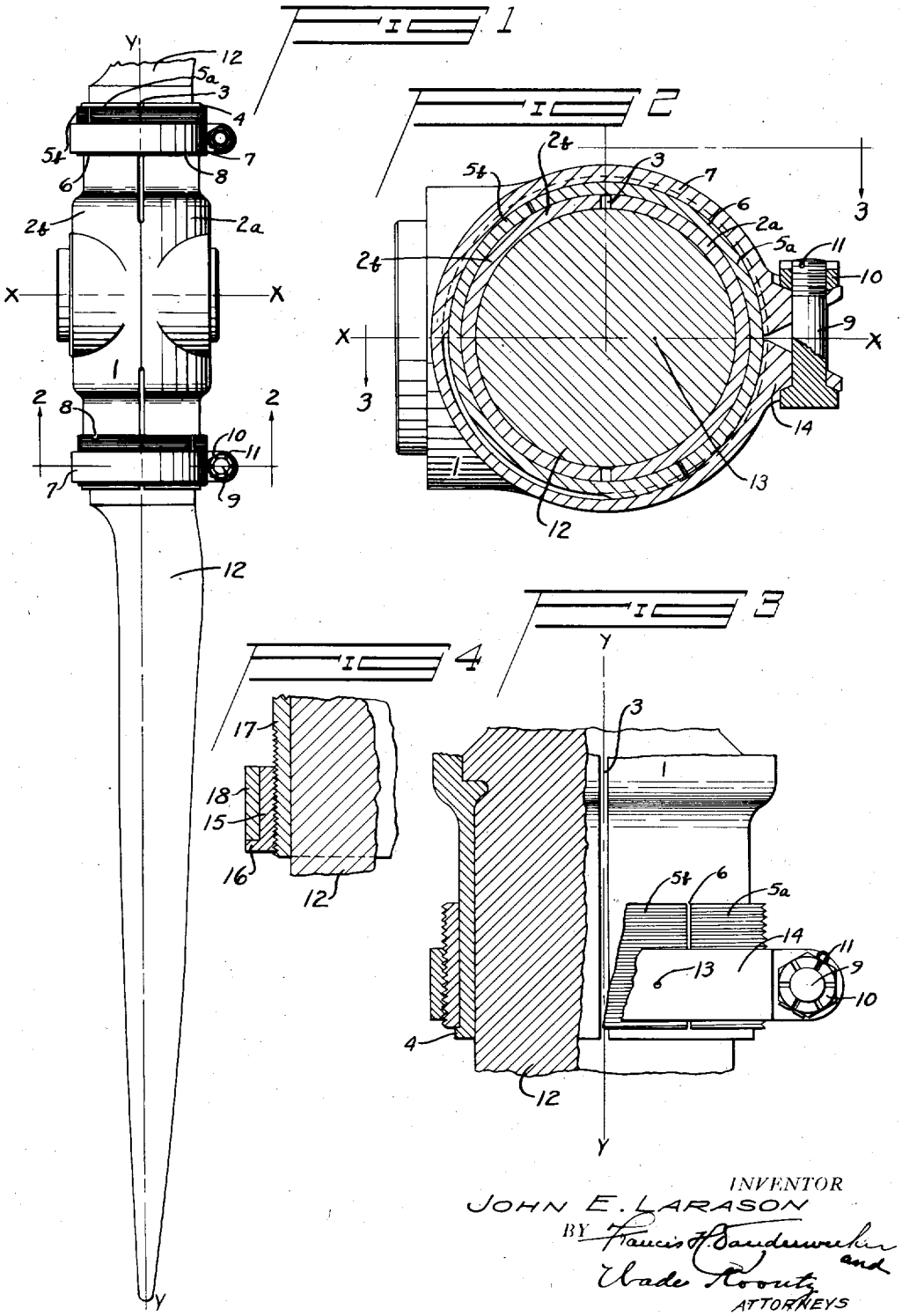
INVENTOR
JOHN E. LARASON
BY Francis H. Sandenwalder and Wade Roouty
ATTORNEYS Reissued Nov. 3, 1936

Re. 20,159

UNITED STATES PATENT OFFICE 20,159

PROPELLER CLAMPING AND BALANCING RING

John E. Larason, Dayton, Ohio

Original No. 1,995,312, dated March 26, 1935, Serial No. 716,509, March 20, 1934. Application for reissue December 17, 1935, Serial No. 54,954

10 Claims. (Cl. 170—160)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to propellers for aircraft having adjustable, detachable or interchangeable blades.

It is well known to those skilled in the art that machining methods, employed in the manufacture of the above-referred-to propeller blades necessitate two balancing operations before placement of an assembled propeller upon an aircraft engine. Having accomplished the first of these operations; i. e., vertical balance of the propeller, in the usual manner, it is a principal object of my invention to proceed with horizontal balance of said propeller without adversely affecting the aforementioned vertical balance.

With the foregoing and other objects in view, which will appear as the description proceeds, the invention consists of certain new and novel improvements in propeller clamp and balancing rings, which will be hereinafter more fully illustrated and described in the accompanying drawing and more particularly pointed out in the appended claims.

Feferring to the drawing, in which numerals of like character designate similar parts throughout the several claims:

Fig. 1 is a partial side view of a propeller incorporting my invention.

Fig. 2 is a cross-sectional view taken on the line 2—2 of Fig. 1.

Fig. 3 is a partial cross-sectional view taken on the line 3—3 of Fig. 2.

Fig. 4 shows in partial cross-section a modified embodiment of my invention.

In Fig. 1 a propeller hub 1, consisting of halves 2a and 2b, is provided with machined end portions having slots 3 and shoulders 4. Split rings 5a and 5b are adapted to be journalled to the aforementioned machined surfaces of the halves 2a and 2b such that gaps 6 exist between the split portions thereof. The outer surfaces of the split rings 5a and 5b are threaded to receive the threaded inner surfaces of clamping rings 7. The split rings 5a and 5b are provided with wrench slots 8. The opening ends of the clamping rings 7 are provided with bolts 9, nuts 10, and cotter pins 11 by means of which the propeller hub 1, propeller blades 12, split rings 5a and 5b and clamping rings 7 are held in fixed relationship.

Fig. 2 is an enlarged cross-sectional view showing the propeller blade 12 clamped fast to the halves 2a and 2b of the propeller hub 1. It will be noted that the center of gravity 13 of clamp assembly 14 is eccentrically located with reference to the longitudinal axis $y—y$ of the propeller blade 12. The bolt 9 has been momentarily positioned normal to the axis $x—x$, in advance of the leading face of the assembled propeller.

Fig. 3 is an additional enlarged view, showing in side elevation a portion of the structure shown in Fig. 2. Assuming that the split rings 5a and 5b are held in constant contact with the shoulder 4 and that the clamp assembly 14 is held against rotation with respect to the propeller hub 1, rotation of the split rings 5a and 5b will effect longitudinal shifting of the center of gravity 13 in a path parallel to the longitudinal axis $y—y$ and, depending upon the direction of split ring rotation, either towards or away from the axis $x—x$ of the propeller assembly.

Fig. 4 shows in partial cross-section a modification of the propeller hub 1, split ring, and clamping ring 7 of Fig. 3. Split rings 15a and 15b provided with shoulders 16, are threaded to the end portion of a propeller hub 17. A clamping ring 18 is journalled to the outer surface of the split rings 15a and 15b, the former in all other respects constituting a duplication of the clamp ring 7.

The operation of my invention is as follows. The propeller assembly is positioned vertically upon a conventional balancing stand, the nuts 10 loosened, and the bolt portions of the clamping rings 7 or 18 rotated either clockwise or counter-clockwise of the clamp position shown in Fig. 2 until there is no tendency of the axis $y—y$ to deviate from true vertical. The propeller assembly is then positioned horizontally upon the balancing stand and lateral adjustment of clamping rings 7 or 18 individually effected in the manner previously discussed above.

It is of primary importance that the split rings 5a and 5b or 15a and 15b at all times maintain positive contact with the shoulders 4 or 16 of the propeller hubs 1 or 17 and that care be taken not to disturb the "vertical balance" settings of the aforementioned clamping rings with reference to the aforementioned propeller hubs. Each nut 10 is just sufficiently loosened to permit rotation of the aforesaid split rings within the aforesaid clamping ring without any turning of the latter with respect to the aforesaid propeller hubs. It is obvious to those skilled in the art that very fine longitudinal adjustments may be obtained by means of my invention, which at the same time provides positive means against my lateral clamping ring slippage under the most severe of flying conditions.

It should be understood that my invention is equally applicable to propellers employing adjustable blades secured in unsplit propeller hubs, through incorporation of the shoulders 4 or 16 upon the outer extremities of the solid hub barrels or placement of similar shoulders upon the blade shanks immediately adjacent to said barrel extremities.

I claim:

1. In a propeller, means for effecting vertical and horizontal balance of said propeller comprising, two sets of ring members oppositely disposed with respect to the axis of propeller rotation and surrounding the blades of the propeller adjacent the root end thereof, each set including inner and outer concentrically arranged ring members, one of said members having its center of gravity eccentrically disposed with respect to the longitudinal axis of said propeller and being angularly adjustable with and linearly adjustable relative to the other member for obtaining vertical and horizontal balance respectively, and having clamping means for locking the same to said other ring member and to said propeller.

2. In a propeller, means for effecting vertical and horizontal balance of said propeller comprising, two sets of ring members oppositely disposed with respect to the axis of propeller rotation and surrounding the blades of the propeller adjacent the root end thereof, each set including inner and outer rotatable elements, each of said inner elements being restrained against relative linear movement with respect to said propeller and each of said outer elements having its center of gravity eccentrically disposed with respect to the longitudinal axis of said propeller blades and being linearly adjustable relative to and angularly adjustable with said inner elements for horizontal and vertical balance respectively, and means for locking said members to each other and to said propeller in the adjusted positions thereof.

3. In a propeller, means for effecting vertical and horizontal balance of said propeller comprising, two sets of ring members oppositely disposed with respect to the axis of propeller rotation and surrounding the blades of the propeller adjacent the root end thereof, each set including inner and outer rotatable elements, each of said inner elements having threaded engagement with its associated outer element and being restrained against relative linear movement with respect to said propeller and each of said outer elements being linearly adjustable relative to and angularly adjustable with said inner elements for horizontal and vertical balance respectively, and means for locking said members to each other and to said propeller in the adjusted positions thereof.

4. In a propeller having a hub and detachable blades connected thereto, means for effecting vertical and horizontal balance of said propeller comprising, two sets of ring members oppositely disposed with respect to the axis of propeller rotation and surrounding the blades of the propeller adjacent the root end thereof, each set including inner and outer rotatable elements, each of said inner elements being threaded to an outer extremity of the hub portion of said propeller and having its outer end provided with an outwardly turned flange and each of said outer elements having its center of gravity eccentrically disposed with respect to the longitudinal axis of said propeller and being journaled to the outer surface of its associated inner element and in engagement with said flange to prevent outboard movement thereof, said elements being relatively adjustable linearly together with respect to said hub and angularly relative to each other for obtaining horizontal and vertical balance respectively, and means for locking said inner and outer elements of each set of members to said propeller.

5. In a propeller having a hub provided with outwardly turned flanges at the extremities thereof and having detachable blades connected thereto, means for effecting vertical and horizontal balance of said propeller comprising, two sets of ring members oppositely disposed with respect to the axis of propeller rotation and surrounding the blades of the propeller adjacent the root end thereof, each set including inner and outer rotatable elements, each of said inner elements comprising a plurality of segments bearing against its associated hub flange and each of said outer elements having its center of gravity eccentrically disposed with respect to the longitudinal axis of the propeller and including a clamping ring threaded upon its associated inner element and a bolt and nut for locking the same thereto and to said hub, said inner and outer elements being adjustable angularly together relative to said hub and linearly relative to each other for obtaining vertical and horizontal balance of said propeller.

6. In a propeller, means for effecting vertical and horizontal balance of said propeller comprising, two sets of ring members oppositely disposed with respect to the axis of propeller rotation, each set including inner and outer split ring members, said members being relatively adjustable angularly and linearly for vertical and horizontal balance respectively, one of said members having its center of gravity eccentrically disposed with respect to the longitudinal axis of said propeller, and means for locking said members to each other and to said propeller in the adjusted positions thereof.

7. In a propeller having hub and detachable blades, means for effecting horizontal balance of said propeller comprising, clamping devices oppositely disposed about the axis of propeller rotation on said hub, each of said clamping devices including means for selectively positioning the same laterally with respect to the axis of propeller rotation, and means for locking said members against movement relative to said propeller.

8. In a propeller having a plurality of blades and means for effecting horizontal balance of said propeller comprising, separate balancing means for each blade radially disposed with respect to the axis of rotation of said propeller, each of said balancing means including inner and outer elements, one of said elements being joined to said propeller, the other being relatively adjustable laterally with respect to said first-mentioned element for obtaining a horizontal balance, and means for locking said elements to each other and to said propeller.

9. In a propeller, means for effecting horizontal balance of a propeller comprising, a pair of split ring members adapted to be mounted on the propeller in concentric relation to each other and to the longitudinal axis of said propeller, one of said elements being adapted to be fixed to said propeller and the other being relatively adjustable longitudinally with respect to said first-mentioned element for obtaining a horizontal balance, and means for locking said elements to each other and to said propeller.

10. In a propeller, means for effecting vertical and horizontal balance of a propeller comprising, a pair of split ring members adapted to be mounted on the propeller in concentric relation to each other and to the longitudinal axis of said propeller, one of said elements having its center of gravity eccentric with respect to the longitudinal axis of said propeller and being fixed thereto, the other being angularly adjustable with and linearly adjustable relative to the former for obtaining vertical and horizontal balance, and means for locking said elements to each other and to said propeller.

JOHN E. LARASON.